May 8, 1956 F. DE JAGER 2,745,063

PULSE-CODE MODULATOR

Filed March 20, 1951 2 Sheets-Sheet 1

INVENTOR
FRANK DE JAGER
BY [signature]
AGENT

INVENTOR
FRANK DE JAGER
BY [signature]
AGENT

United States Patent Office 2,745,063

Patented May 8, 1956

2,745,063

PULSE-CODE MODULATOR

Frank de Jager, Eindhoven, Netherlands, assignor to Hartford National Bank and Trust Company, Hartford, Conn., as trustee Application March 20, 1951, Serial No. 216,486

Claims priority, application Netherlands March 29, 1950

9 Claims. (Cl. 332—11)

This invention relates to pulse-code modulators and may be used with particular advantage for the direct transmission of pulse-code modulated voice, music or television signals, which within established limits, vary both in amplitude and in frequency, as distinguished from Morse code and similar signals which do not vary at random in amplitude and frequency, although Morse signals can also be transmitted with the use of the invention.

Pulse-code modulation is characterized by the combined use of time and amplitude quantization.

The use of time quantization is to be taken to mean that only such pulses are taken from the pulse code modulator as coincide with pulses contained in a series of pulses each pulse of which is separated from the adjacent pulse by the same time interval; such pulses are termed equidistant pulses. An arrangement of this type substantially eliminates transmission errors introduced into the receiver due to time shifts of the signal pulses caused by the use of pulse regenerators. Particularly when transmitting signals through a plurality of relay transmitters, this constitutes a special advantage which is absent from pulse position modulation and other kinds of pulse modulation. With time-multiplex transmission of a plurality of signals, time quantization at the same time may be utilized to minimize cross-talk between different channels.

Whereas in other conventional modulation methods any instantaneous value of the signal within certain limits can be transmitted, the use of amplitude quantization only permits the transmission of a limited number of amplitude levels. Thus, for example, it is possible to transmit pulse-code modulated voice signals making use of a binary five-digit code. In this system only 32 different amplitude levels can be transmitted. The signal to be transmitted is sampled at equally spaced time intervals, but instead of transmitting the instantaneous values of the signal which occur at these time intervals, the nearest of the 32 transmissible amplitude levels is transmitted, since the transmitted level is coded in a code-pulse group modulator. When using a five-digit code, this group is composed of not more than five equal and equidistant pulses. The presence or the absence of one or more digit-pulses of a code-pulse group characterizes this amplitude level and thus approximates the instantaneous amplitude of the signal. The pulse groups transmitted are equidistant and exhibit a recurrence frequency (cycle frequency) which is approximately twice the maximum signal frequency to be transmitted.

Furthermore, pulse-code modulators have been suggested in which the signals to be transmitted control a pulse modulator connected to a generator of equidistant pulses, the system also containing a return circuit shunting the pulse modulator comprising a pulse-code demodulator, which is connected in series with a signal frequency integrating network and a device termed a difference producer. This device also receives the signal to be transmitted. Thus the difference producer receives both the signal from the return circuit and the signal to be transmitted and develops in its output circuit a difference voltage whose polarity may be positive or negative depending upon whether the instantaneous value of the return voltage is greater or smaller than the instantaneous value of the signal to be transmitted. Viewed in a time diagram this return voltage winds about the incoming signal. Under the control of the polarity of this difference voltage, the pulses from the pulse generator are either suppressed or supplied by the pulse modulator to the output circuit of the pulse code modulator.

In the present pulse-code modulators containing a return circuit, the amplitude of the return voltage may exceed the amplitude of the signal voltage approximated by it, in contradistinction to the feedback known for linear amplifiers.

The term signal frequencies integrating network is to be understood to mean a network which supplies an output voltage which is proportional to a time integral of the input voltage over the complete frequency range of the signals to be transmitted or over a material portion of this range. Consequently, the reciprocal value of the transmission factor (ratio between output and input voltages) of the network is, for example proportional to the frequency of the voltage supplied thereto within this signal-frequency range. In a simple form, such a network consists of a series resistance and a transverse capacitor of such value that $2\pi$ times the time constant is approximately equal to one cycle of a lower or of the lowest signal frequency. Consequently, in the case of a constant A. C.-input voltage, the output voltage decreases with an increase in signal frequency, in contradistinction to a low-pass filter which allows all signal frequencies to pass substantially equally.

Whereas in the first mentioned transmitters for pulse-code modulation with the use of a special pulse group code the output pulses represent the approximate signal amplitude at any given moment, the pulse code modulators with return circuit produce output pulses which represent, at any instant of transmission, substantially only the difference of the then occurring instantaneous amplitude of the signal with respect to the instantaneous amplitude of the signal at the preceding instant of transmission. This difference is substantially independent of the amplitude of the signal over at least a material portion of the frequency range to be transmitted.

These pulse-code modulators comprising a return circuit may be so constructed that only the polarity of the difference voltage is characterized (one-unit code) or (as in U. S. patent application Ser. No. 75,663 filed February 10, 1949, now Patent No. 2,662,113) the quantized instantaneous value of the difference voltage (multi-units code) is reproduced by a binary pulse-group or similar code.

Since a limited number of amplitude levels is used in pulse-code modulation, only an approximation of the signal is transmitted. This produces a certain "quantization noise," which is directly connected with the value of an amplitude quantum. By reducing the amplitude quanta the quantization noise may be reduced, but this involves rapidly increasing technical difficulties with respect to the coding and decoding apparatus; in addition the higher pulse recurrence frequencies then required may be very objectionable.

It has been suggested to obviate these disadvantages by using, at the transmitter end, a frequency-independent, exponentially varying amplitude-compression of the signals to be transmitted. Thus, only signals of low amplitude are substantially unaltered, so that corresponding amplitude expansion is required at the receiver side. Thereby, the quantization noise is not really reduced, but its disturbing effect is diminished in the case of low signal voltages, so that the quantization noise apparently decreases.

The object of the invention is to improve pulse-code modulators comprising a return circuit such that with the same value of the amplitude quanta a more accurate reproduction of the signals is possible, and, in the range of the signal frequencies, a virtually reduced quantization noise is ensured.

According to the invention, in pulse-code modulators comprising a return circuit of the said type and the series combination of a signal frequencies integrating network and a difference producer controlled by the return voltage and the signals to be transmitted, the series combination comprises an additional network which integrates the pulse frequencies located between signal frequencies and the recurrence frequency of the equidistant pulses.

In the present specification, the term network which integrates the pulse frequencies located between signal frequencies and the recurrence frequency of the equidistant pulses, briefly termed pulse frequencies integrating network, is to be understood to mean a network which produces an output voltage proportional to a time integral or a multiple time integral, of the input voltage within the said range of the pulse frequencies occurring in the return voltage and which otherwise allows all signal frequencies to pass with susbtantially equal amplitude and allows these signal frequencies to be transmitted with a high degree of fidelity.

The two integrating networks are preferably so constructed that the reciprocal value of the transmission factor of the said series-connection is approximately proportional to frequencies lying within the signal frequency range, and is proportional to at least the square of the frequency in the frequency range between the maximum signal frequency and substantially one half the maximum pulse recurrence frequency, and again is approximately proportional to the frequency in regard to higher frequencies.

By the invention the spectral division of the quantization noise energy is greatly changed, since this noise energy is reduced in the signal frequency band. The noise energy is increased for frequencies exceeding the signal frequency band, but this is not troublesome in signal reproduction at the receiver side, since these frequencies exceeding the signal frequency band are suppressed.

It should be noted here that with the use of two signal-frequencies integrating networks in the return circuit the circuit-arrangement tends to become unstable.

The improvement of this invention over pulse-code modulators without pulse-frequencies integrating network appears from the following.

With the use of a pulse-frequencies integrating network the circuit-arrangement tends to transmit the pulses, in contradistinction to former circuit-arrangements, in such manner that, viewed in a period of time comprising few periods of the highest pulse frequency occurring in the return voltage, the time integral of the divergences of the return voltage with respect to the signal voltage in positive and negative direction becomes approximately zero. This also involves that variations of an input direct voltage, which did not produce a variation of the pulse train emitted in the former pulse-code modulator, now produce a corresponding variation of the pulse train emitted, although with a slight delay which is immaterial to the frequencies to be transmitted themselves.

Thus, the "response level" of the pulse code-modulator has been changed advantageously which is equivalent to a reduction of the amplitude quanta.

It has been found to be particularly advantageous to include a resonance circuit in the series-connection of the return circuit, this resonance circuit being preferably tuned so that, when a pulse is supplied to this series-connection, the output voltage of the series-connection contains an alternating switching-in voltage, the frequency of which corresponds with a higher signal frequency.

In order that the invention may be more clearly understood and readily carried into effect, it will now be described more fully with reference to the accompanying drawings, given by way of example.

Figure 8:
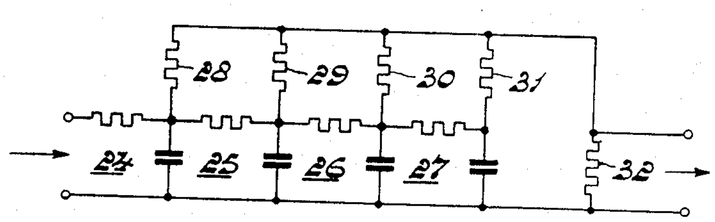

Finally, Fig. 8 shows the series-connection of a number of integrating networks as may also be used in accordance with the invention.

Figures 1, 2, 3, 4:
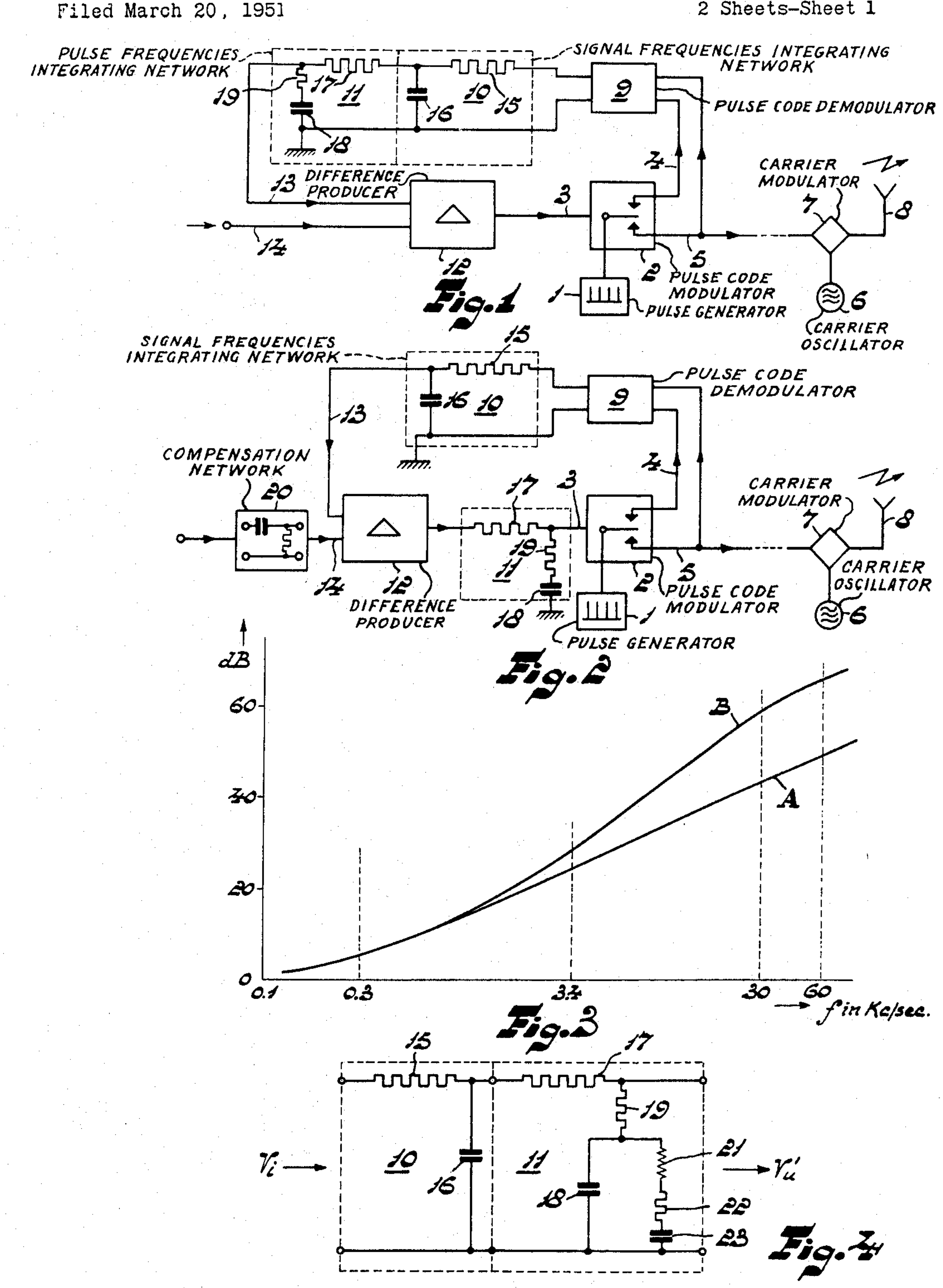
Fig. 1 illustrates a pulse-code modulation transmitting system which demonstrates the basic invention.
Fig. 2 represents a modification of Fig. 1.
Fig. 3 shows damping curves to explain the proportioning of the series connection of integrating networks used in accordance with the invention.
Fig. 4 shows a particularly advantageous form of the series-connection of two integrating networks used in accordance with the invention.

The transmiter shown in Fig. 1 comprises a pluse generator 1 producing equidistant digit pulses which are supplied to a pulse modulator 2. The pulse modulator 2 is shown diagramatically as a change over switch. In accordance with the polarity of the voltage supplied to the pulse modulator through a line 3, the pulses from pulse generator 1 are supplied to line 4 or 5. The pulses appearing in the line 5 modulate a carrier-wave from a carrier-wave oscillator 6 in a modulator 7, to the output circuit of which a transmitting antenna 8 is connected. The supply line 5 to the carrier modulator 7 may include so-called regenerators to improve the form or to modify the duration of the pulses to be emitted.

The pulse modulator 2 is shunted by a return circuit which comprises the series connection successively of a pulse-code demodulator 9 fed by the modulator 2, a signal-frequencies integrating network 10 included in the output circuit thereof, a pulse-frequencies integrating network 11 and a difference producer 12. In addition to the return voltage across the line 13, the signal to be transmitted is also supplied to the difference producer by way of line 14.

The circuit-diagram shown in Fig. 1 does not show in detail the pulse generator 1, the pulse-code modulator 2, the pulse-code demodulator 9 and the difference producer 12, since this is immaterial to a good understanding of the present invention. For various potential detailed embodiments of these elements reference is made to the detailed views in the copending U. S. patent application Ser. No. 75,663, now Patent No. 2,662,113.

As stated above, the return circuit shunting the pulse-code modulator 2 comprises the series connection of two integrating networks; the first integrating network 10 is a signal frequencies integrating network and comprises a series resistance 15 and a parallel capacitor 16. The second integrating network 11 connected to the output terminals of the signal-frequencies integrating network 10 is a pulse-frequencies integrating network and comprises a series resistance 17, the parallel impedance consisting of the series-connection of a capacitor 18 and a coupling resistance 19. The coupling resistance 19 has the effect that part of the output voltage of the first signal-frequencies integrating network occurs between the output terminals of the pulse-frequencies integrating network 11, together with the integration voltage across the capacitor 18.

The sequence in the series-connection of the integrating networks 10, 11 and the difference producer 12 illustrated in Fig. 1 may be modified.

Fig. 2 shows a transmitter circuit-diagram substantially corresponding to that shown in Fig. 1, elements corresponding to those of Fig. 1 bearing the same reference numerals. In Fig. 2, however, the pulse frequencies integrating network 11 and the difference producer 12 have changed places. Owing to this change the pulse frequencies integrating network 11 is now located between the difference producer 12 and the pulse-code modulator 2, so that the signal to be transmitted which is supplied to the difference producer 12 through the line 14, is led through the pulse frequencies integrating network 11. In order to correct for any amplitude distortion due thereto, the input line 14 may include a compensation network 20. For the sake of simplicity the interchangeability of the elements 10, 11 and 12 of the circuit-arrangements shown in Figs. 1 and 2 is no longer observed hereinafter; essential is the use of two integrating networks, one of which operates in an integrating manner for the frequency band of the speech or music signals to be transmitted and for pulse frequencies, and the other integrating only with regard to pulse frequencies exceeding the signal frequency band. For frequencies of the frequency band of the speech or music signals to be transmitted, which band extends for example from 0.3 kc. to 3.4 kc., essentially single integration occurs, double integration occurring within a frequency band exceeding the former.

Fig. 3 shows the attenuation curves of the networks used, the frequency being plotted in a logarithmical scale on the horizontal axis, the attenuation in db on the vertical axis. Curve A shows the attenuation produced by the signal frequencies integrating network. This network is proportioned so that for frequencies exceeding 0.3 kc. the reciprocal value of the transmission factor increases linearly with the frequency (slope approximately 6 db per octave). The pulse frequencies integrating network behaves for frequencies between 0.3 kc. and 3.4 kc. as a low-pass filter, but the time constant is such that for frequencies exceeding 3.4 kc. an integrating effect is ensured, owing to which the said reciprocal value for this network increases linearly with the frequency. Owing to the series-connection of the two integrating networks the said reciprocal value for the series-connection in excess of 3.4 kc. increases quadratically with the frequency (slope approximately 12 db per octave).

If the recurrence frequency of the pulses supplied by the pulse modulator 1 is 60 kc., in view of the quantization noise, it is desirable to provide that for this maximum pulse recurrence frequency no double integration should occur in the return circuit. To this end the pulse frequencies integrating network 11 comprises a coupling resistance 19, the value of which is chosen in connection with the value of the capacitor 18 such that the time constant of these elements together is approximately equal to half the time interval between two successive pulses. Thus, for frequencies exceeding 30 kc. the effect of the pulse frequencies integrating network 11 on the phase shift of the return voltage across the line 13 is substantially negligible. The attenuation of the series-connection of the integrating networks 10 and 11 then varies in accordance with curve B in Fig. 3. For frequencies lower than 0.3 kc., the series-connection behaves essentially as a low-pass filter: between 0.3 and 3.4 kc. single integration occurs and the reciprocal value of the transmission factor increases linearly with the frequency; between 3.4 and 30 kc. double integration occurs and the said reciprocal value increases quadratically with the frequency; for higher frequencies again single integration occurs and the said reciprocal value accordingly increases again linearly with the frequency.

By experiments it has been found particularly advantageous to include a resonant circuit in the series-connection of the integrating networks, as shown in Fig. 4.

Figure 5:
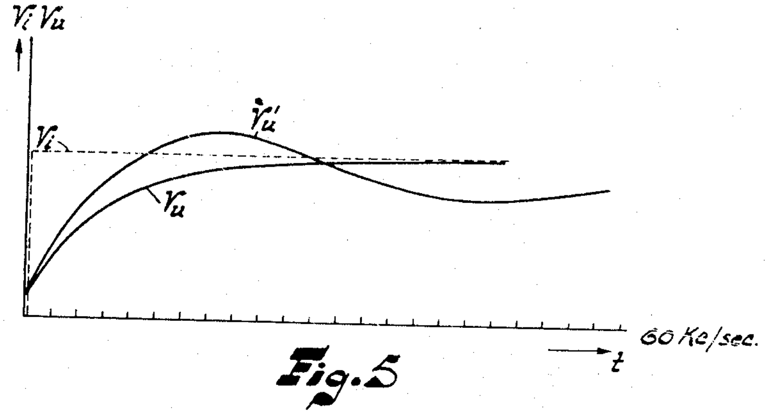
Fig. 5 shows, by way of explanation thereof, diagrams of input and output voltages of the series-connection shown in Fig. 4.

Similarly to Figs. 1 and 2, provision is made of series resistors 15, 17, parallel capacitors 16, 18 and of a coupling resistor 19. Parallel to the transverse capacitor 18 of the pulse frequencies integrating network is connected a resonance circuit comprising the series-connection of a coil 21, a damping resistance 22 and a capacitor 23. If a pulse voltage $V_i$ is supplied to the input of the series-connection, as shown in the time diagram of Fig. 5, the output voltage of the series-connection would exhibit the variation designated $V_u$ in Fig. 5 in the absence of the resonant circuit. Owing to the presence of the resonance circuit, however, the output voltage of the series-connection varies as shown at $V_u'$. Owing to building up phenomena the output voltage $V_u$, has a damped alternating voltage component, the frequency of which corresponds with a higher signal frequency of, say 2.7 kc. To illustrate the latter, pulses with a recurrence frequency of 60 kc., as supplied by the pulse generator 1 in Figs. 1 and 2, are plotted on the time axis in Fig. 5.

Suitable values of the elements of the circuit-arrangement shown in Fig. 4 with a maximum pulse recurrence frequency of 60 kc. and a signal frequency band of approximately 0.3 to 3.4 kc. have been found to be:

$R_{15}$=30,000 ohms
$R_{17}$=10,000 ohms
$R_{19}$=500 ohms
$R_{22}$=3,000 ohms
$C_{16}$=24,000 pf.
$C_{18}$=16,000 pf.
$C_{23}$=50,000 pf.
$L_{21}$=290 mh.

In the network shown in Fig. 4, the attenuation varies in the desired manner with the frequency, if the aforesaid values are used.

For low frequencies (to approximately 1 kc.) the capacitors 16, 18 and 23 are practically considered to be parallel connected and single integration occurs.

In the frequency range of approximately 1 kc. to 3 kc., in the absence of coil 21, the attenuation already would increase as in the case of double integration. Owing to the presence of this coil, however, the impedance of the circuit connected in parallel with the capacitor 18 becomes gradually higher with an increase in frequency. The output voltage of the network is thus higher than in the absence of the coil, since at low frequencies the capacitors 18 and 23 may be considered to be connected in parallel, whereas at high frequencies only the capacity of the capacitor 18 is essential. Consequently single integration occurs also in the range from approximately 1 kc. to 3 kc. In the frequency range of approximately 4 kc. to 30 kc., double integration occurs, and for frequencies exceeding 30 kc. the effect of the capacitors 18 and 23 is negligible, so that the resistances 17 and 19 constitute a grounded potentiometer, only the resistance 15 and the capacitor 16 being of primary importance and the network having a single integrating effect.

Figure 6:
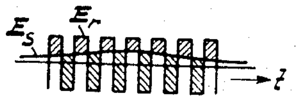
Fig. 6 represents a time diagram of signal and return voltages in a typical known pulse-code modulation.
Figure 7:
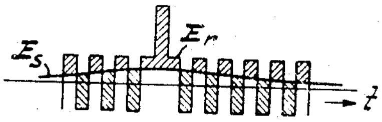
Fig. 7 represents a time diagram of signal and return voltages in a pulse-code modulator according to the invention.

The effect of the use of the pulse frequencies integrating network in the return circuit will now be set out with reference to Figs. 6 and 7.

As stated in the preamble, in circuit-arrangements of the present kind, the return circuit has produced across it at the input of the difference producer a voltage which winds about the input voltage. In Fig. 6, $E_s$ designates the signal voltage supplied to the difference producer and $E_r$ the rectangular return voltage across the return circuit.

In former pulse-code modulation arrangements with the use of single integration in the return circuit, a signal voltage of the value indicated in Fig. 6 is too low to produce a variation of the return voltage and consequently of the pulse train emitted. With the use of an additional pulse-frequencies integrating network connected in series with a signal frequencies integrating network, matters are different as shown in Fig. 7. The pulse frequencies integrating network provides, in effect, that after a few periods of the maximum pulse recurrence frequency (60 kc.) a variation of the pulse train emitted and consequently of the return voltage occurs in a manner such that in a time comprising several periods of the maximum pulse recurrence frequency the integral value of positive differences between the return voltage $E_r$ and the signal voltage $E_s$ becomes approximately equal to the integral value of negative differences between the voltages $E_s$ and $E_r$. Figs. 6 and 7 give an impression of the said integral values by comparison of the extents of the differently cross-hatched surface areas. If use is made of the invention the circuit-arrangement tends to equal integral values, in contradistinction to former circuit-arrangements which operate in the manner shown in Fig. 6. This means an improved response level of the pulse-code modulator and is equivalent to a reduction of the amplitude quanta used. This reduction of the quanta, however, is ensured without the use of a higher pulse recurrence frequency.

Instead of effecting double integration, as in Figs. 1, 2 and 4, for pulse recurrence frequencies exceeding the signal frequency band, more than double integration may take place, the reciprocal value of the transmission factor of the series connection in the return circuit increasing by the third or even a still higher power of the frequency, for example in a range between 4 and 30 kc. In this case, particular attention should be focussed to sufficient stability of the circuit-arrangement, for which purpose the phase shift of this network in the range of the signal frequencies must remain below 180°. In order to achieve this, it is advantageous to combine the output voltages of the series-connected integrating networks in a suitable mixing ratio, for which purpose use may be made of a series-connection as shown in Fig. 8. This series-connection comprises four integrating networks 24, 25, 26, 27, corresponding output terminals being connected through separate resistors 28, 29, 30 and 31 to a common output resistor 32 of the series-connection.

What I claim is:

1. Apparatus for translating intelligence signals having a predetermined frequency range into code modulated pulses having a repetition rate substantially higher than the maximum frequency in said frequency range, said apparatus comprising a pulse code modulator yielding code modulated pulses, means to supply to said modulator pulses of said repetition rate, a return circuit for said modulator and including a pulse code demodulator, a first network integrating all voltages whose frequencies fall within said signal frequency range, a second network integrating all voltages whose frequencies fall between the maximum frequency of said signal frequency range and said repetition rate and a difference producer having first and second input circuits, said producer having amplifying characteristics at which the voltage produced in the output thereof is proportional to the difference in the voltages supplied to said input circuits, the output of said pulse code modulator being fed serially through said demodulator, said networks and through the first input circuit of said difference producer circuit to the input of the pulse code modulator, and means to supply the intelligence signal through the second input circuit of said difference producer to the input of said modulator.

2. Apparatus for translating intelligence signals having a predetermined frequency range into code modulated pulses having a repetition rate substantially higher than the maximum frequency in said frequency range, said apparatus comprising a pulse code modulator yielding code modulated pulses, means to supply to said modulator pulses of said repetition rate, a return circuit for said modulator and including a pulse code demodulator, a first network integrating all voltages whose frequencies fall within said signal frequency range, a second network integrating all voltages whose frequencies fall between the maximum frequency of said signal frequency range and said repetition rate and a difference producer having first and second input circuits, said producer having amplifying characteristics at which the voltage produced in the output thereof is proportional to the difference in the voltages supplied to said input circuits, the output of said pulse code modulator being fed serially through said demodulator, said first and second networks and the first input circuit of said difference producer circuit in the order named to the input of the pulse code modulator, and means to supply the intelligence signal through the second input circuit of said difference producer to the input of said modulator.

3. Apparatus, as set forth in claim 2, wherein the second network includes a resonant circuit.

4. Apparatus, as set forth in claim 3, wherein the resonant circuit is tuned to a frequency at which the output voltage of the second network will include a transient alternating voltage having a frequency which substantially corresponds to the central frequency in said range.

5. Apparatus for translating intelligence signals having a predetermined frequency range into code modulated pulses having a repetition rate substantially higher than the maximum frequency in said frequency range, said apparatus comprising a pulse code modulator yielding code modulated pulses, means to supply to said modulator pulses of said repetition rate, a return circuit for said modulator and including a pulse code demodulator, a first network integrating all voltages whose frequencies fall within said signal frequency range, a second network integrating all voltages whose frequencies fall between the maximum frequency of said signal frequency range and said repetition rate and a difference producer having first and second input circuits, said producer having amplifying characteristics at which the voltage produced in the output thereof is proportional to the difference in the voltages supplied to said input circuits the output of said pulse code modulator being fed serially through said demodulator, the first network, the first input circuit of said difference producer circuit, and said second network in the order named to the input of the pulse code modulator, and means to supply the intelligence signal through the second input circuit of said difference producer to the input of said modulator.

6. Apparatus, as set forth in claim 5, wherein the second network includes a series resistance and in parallel with said resistance a series combination of capacitance and resistance.

7. Apparatus, as set forth in claim 5, wherein the series combination of capacitance and resistance has a time constant substantially equal to half the time interval between successive code modulated pulses.

8. Apparatus, as set forth in claim 5, wherein a series resonant circuit is connected in parallel with the capacitance of said second network.

9. Apparatus for translating intelligence signals having a predetermined frequency range into code modulated pulses having a repetition rate substantially higher than the maximum frequency in said frequency range, said apparatus comprising a pulse code modulator yielding code modulated pulses, means to supply to said modulator pulses of said repetition rate, a return circuit for said modulator and including a pulse code demodulator, a first network integrating all voltages whose frequencies fall within said signal frequency range, a second network integrating all voltages whose frequencies fall between the maximum frequency of said signal frequency range and said repetition rate, said second network including a plurality of elementary networks the outputs of which are supplied through separate resistors to a common output resistor of said second network, and a difference producer having first and second input circuits and having amplifying characteristics at which the voltage produced in the output thereof is proportional to the difference in the voltages supplied to said input circuits, the output of said pulse code modulator being fed serially through said demodulator, said networks and through the first input circuit of said difference producer circuit to the input of the pulse code demodulator, means to supply the intelligence signal through the second input circuit of said difference producer to the input of said modulator.

References Cited in the file of this patent

UNITED STATES PATENTS

| | | |
|---|---|---|
| 2,085,409 | Bedford | June 29, 1937 |
| 2,172,453 | Rose | Sept. 12, 1939 |
| 2,469,218 | Thomas | May 3, 1949 |
| 2,491,969 | Gloess | Dec. 20, 1949 |
| 2,520,125 | Clavier | Aug. 29, 1950 |
| 2,539,623 | Heising | Jan. 30, 1951 |